(12) United States Patent
Anschuetz

(10) Patent No.: US 10,011,339 B2
(45) Date of Patent: Jul. 3, 2018

(54) SYSTEM AND METHOD FOR CONTROLLING TRIM POSITION OF PROPULSION DEVICES ON A MARINE VESSEL

(71) Applicant: Brunswick Corporation, Lake Forest, IL (US)

(72) Inventor: Steven M. Anschuetz, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 8 days.

(21) Appl. No.: 15/243,101

(22) Filed: Aug. 22, 2016

(65) Prior Publication Data

US 2018/0050779 A1 Feb. 22, 2018

(51) Int. Cl.
*B63H 20/10* (2006.01)
*B63H 20/00* (2006.01)

(52) U.S. Cl.
CPC ....... *B63H 20/10* (2013.01); *B63H 2020/003* (2013.01)

(58) Field of Classification Search
CPC .......................... B63H 20/10; B63H 2020/003
See application file for complete search history.

(56) References Cited

U.S. PATENT DOCUMENTS

| | | |
|---|---|---|
| 3,777,694 A | 12/1973 | Best |
| 3,999,502 A | 12/1976 | Mayer |
| 4,050,359 A | 9/1977 | Mayer |
| 4,318,699 A | 3/1982 | Wenstadt et al. |
| 4,490,120 A | 12/1984 | Hundertmark |
| 4,565,528 A | 1/1986 | Nakase |
| 4,718,872 A | 1/1988 | Olson et al. |
| 4,749,926 A | 6/1988 | Ontolchik |
| 4,776,818 A | 10/1988 | Cahoon et al. |
| 4,824,407 A | 4/1989 | Torigai et al. |

(Continued)

FOREIGN PATENT DOCUMENTS

| | | |
|---|---|---|
| EP | 2368791 B1 | 1/2013 |
| JP | 61-108098 | 5/1986 |

(Continued)

OTHER PUBLICATIONS

Andrasko et al., "Systems and Methods for Providing Notification Regarding Trim Angle of a Marine Propulsion Device", Unpublished U.S. Appl. No. 14/573,200, filed Dec. 17, 2014.

(Continued)

*Primary Examiner* — Mussa A Shaawat
*Assistant Examiner* — Michael V Kerrigan
(74) *Attorney, Agent, or Firm* — Andrus Intellectual Property Law, LLP

(57) ABSTRACT

A method of controlling trim position of two or more propulsion devices on a marine vessel includes receiving a running trim position for the two or more propulsion devices and receiving at least one of a steering input value or a roll angle of the marine vessel. An adjusted trim position for each of the at least two propulsion devices is then determined based on the running trim position and the steering input value or the roll angle of the marine vessel. A trim actuator for each propulsion device is then operated to move each propulsion device toward its respective adjusted trim position.

20 Claims, 8 Drawing Sheets

(56) References Cited

U.S. PATENT DOCUMENTS

| | | |
|---|---|---|
| 4,836,810 A | 6/1989 | Entringer |
| 4,861,292 A | 8/1989 | Griffiths et al. |
| 4,872,857 A | 10/1989 | Newman et al. |
| 4,898,563 A | 2/1990 | Torigai et al. |
| 4,908,766 A | 3/1990 | Takeuchi |
| 4,931,025 A | 6/1990 | Torigai et al. |
| 4,939,660 A | 7/1990 | Newman et al. |
| 4,940,434 A | 7/1990 | Kiesling |
| 4,957,457 A | 9/1990 | Probst et al. |
| 5,080,064 A | 1/1992 | Buslepp et al. |
| 5,113,780 A | 5/1992 | Bennett et al. |
| 5,142,473 A | 8/1992 | Davis |
| 5,171,172 A | 12/1992 | Heaton et al. |
| 5,263,432 A | 11/1993 | Davis |
| 5,352,137 A | 10/1994 | Iwai et al. |
| 5,366,393 A | 11/1994 | Uenage et al. |
| 5,385,110 A | 1/1995 | Bennett et al. |
| 5,474,012 A | 12/1995 | Yamada et al. |
| 5,474,013 A | 12/1995 | Wittmaier |
| 5,507,672 A | 4/1996 | Imaeda |
| 5,540,174 A | 7/1996 | Kishi et al. |
| 5,647,780 A | 7/1997 | Hosoi |
| 5,683,275 A | 11/1997 | Nanami |
| 5,707,263 A | 1/1998 | Eick et al. |
| 5,832,860 A | 11/1998 | Lexau |
| 5,836,851 A | 11/1998 | Ruman |
| 5,848,582 A | 12/1998 | Ehlers et al. |
| 5,879,209 A | 3/1999 | Jones |
| 6,007,391 A | 12/1999 | Ellen |
| 6,009,371 A | 12/1999 | Kobayashi |
| 6,095,077 A | 8/2000 | DeAgro |
| 6,152,102 A | 11/2000 | Ruman |
| 6,167,830 B1 | 1/2001 | Pilger |
| 6,273,771 B1 | 8/2001 | Buckley et al. |
| 6,298,824 B1 | 10/2001 | Suhre |
| 6,322,404 B1 | 11/2001 | Magee et al. |
| 6,354,237 B1 | 3/2002 | Gaynor et al. |
| 6,425,370 B1 | 7/2002 | Kramer |
| 6,458,003 B1 | 10/2002 | Krueger |
| 6,561,016 B1 | 5/2003 | Suhre et al. |
| 6,583,728 B1 | 6/2003 | Staerzl |
| 6,587,765 B1 | 7/2003 | Graham et al. |
| 6,701,890 B1 | 3/2004 | Suhre et al. |
| 6,733,350 B2 | 5/2004 | Lida et al. |
| 6,745,715 B1 | 6/2004 | Shen et al. |
| 6,757,606 B1 | 6/2004 | Gonring |
| 6,997,763 B2 | 2/2006 | Kaji |
| 7,143,363 B1 | 11/2006 | Gaynor et al. |
| 7,156,709 B1 | 1/2007 | Staerzl et al. |
| 7,163,000 B2 | 1/2007 | Ishida et al. |
| 7,188,581 B1 | 3/2007 | Davis et al. |
| 7,311,058 B1 | 12/2007 | Brooks et al. |
| 7,347,753 B1 | 3/2008 | Caldwell et al. |
| 7,357,120 B2 | 4/2008 | Kaji |
| 7,389,165 B2 | 6/2008 | Kaji |
| 7,416,456 B1 | 8/2008 | Gonring et al. |
| 7,462,082 B2 | 12/2008 | Kishibata et al. |
| 7,473,149 B2 | 1/2009 | Mizokawa |
| 7,524,219 B2 | 4/2009 | Torrangs et al. |
| 7,543,544 B2 | 6/2009 | Yap |
| 7,556,547 B2 | 7/2009 | Kaji |
| 7,617,026 B2 | 11/2009 | Gee et al. |
| 7,641,525 B2 | 1/2010 | Morvilla |
| 7,917,283 B2 | 3/2011 | Kado |
| 7,942,711 B1 | 5/2011 | Swan |
| 7,972,243 B2 | 7/2011 | Kado et al. |
| 7,976,354 B2 | 7/2011 | Kubota et al. |
| 8,011,982 B1 | 9/2011 | Baier et al. |
| 8,113,892 B1 * | 2/2012 | Gable .................. B63H 21/21 114/144 RE |
| 8,145,370 B2 | 3/2012 | Barrett |
| 8,216,007 B2 | 7/2012 | Moore |
| 8,261,682 B1 | 9/2012 | DeVito |
| 8,340,847 B2 | 12/2012 | Sako et al. |
| 8,376,791 B2 | 2/2013 | Chiecchi |
| 8,376,793 B2 | 2/2013 | Chiecchi |
| 8,388,390 B2 | 3/2013 | Kuriyagawa et al. |
| 8,428,799 B2 | 4/2013 | Cansiani et al. |
| 8,444,446 B2 | 5/2013 | Kuriyagawa et al. |
| 8,457,820 B1 | 6/2013 | Gonring |
| 8,480,445 B2 | 7/2013 | Morvillo |
| 8,583,300 B2 | 11/2013 | Oehlgrien et al. |
| 8,622,777 B1 | 1/2014 | McNalley et al. |
| 8,631,753 B2 | 1/2014 | Morvillo |
| 8,740,658 B2 | 6/2014 | Kuriyagawa |
| 8,762,022 B1 | 6/2014 | Arbuckle et al. |
| 8,807,059 B1 | 8/2014 | Samples et al. |
| 8,855,890 B2 | 10/2014 | Egle et al. |
| 8,858,278 B2 | 10/2014 | Morvillo |
| 9,039,468 B1 | 5/2015 | Arbuckle et al. |
| 9,052,717 B1 | 6/2015 | Walser et al. |
| 9,145,839 B1 | 9/2015 | Andrasko |
| 9,156,536 B1 | 10/2015 | Arbuckle et al. |
| 9,248,898 B1 | 2/2016 | Kirchhoff et al. |
| 9,278,740 B1 * | 3/2016 | Andrasko ............ G05D 1/0875 |
| 9,290,252 B1 | 3/2016 | Tuchscherer et al. |
| 9,381,989 B1 | 7/2016 | Poirier |
| 9,567,052 B2 | 2/2017 | Torrangs et al. |
| 2002/0086593 A1 | 7/2002 | Shidara et al. |
| 2003/0000500 A1 | 1/2003 | Chatfield |
| 2003/0013359 A1 | 1/2003 | Suganuma et al. |
| 2003/0027468 A1 | 2/2003 | Into |
| 2003/0054704 A1 | 3/2003 | Kanno |
| 2003/0120360 A1 | 6/2003 | Yasui et al. |
| 2004/0069271 A1 | 4/2004 | Kanno et al. |
| 2004/0069272 A1 | 4/2004 | Allen et al. |
| 2005/0245147 A1 | 1/2005 | Takada et al. |
| 2006/0047406 A1 | 3/2006 | Chatfield et al. |
| 2006/0166573 A1 | 7/2006 | Vetta et al. |
| 2007/0089654 A1 | 4/2007 | Bradley et al. |
| 2007/0089660 A1 | 4/2007 | Bradley et al. |
| 2008/0051979 A1 | 2/2008 | Yasui et al. |
| 2008/0280511 A1 | 11/2008 | Kado |
| 2010/0191397 A1 | 7/2010 | Nose et al. |
| 2011/0202258 A1 | 8/2011 | Fukushima et al. |
| 2011/0263167 A1 | 10/2011 | Chiechhi et al. |
| 2011/0297462 A1 | 12/2011 | Grajkowski et al. |
| 2012/0135649 A1 | 5/2012 | Morvillo |
| 2012/0191275 A1 | 7/2012 | Clever et al. |
| 2013/0312651 A1 | 11/2013 | Gai |
| 2013/0340667 A1 | 12/2013 | Morvillo |
| 2014/0209007 A1 | 7/2014 | Morvillo |
| 2014/0224166 A1 | 8/2014 | Morvillo |
| 2014/0295717 A1 | 10/2014 | Kuriyagawa et al. |
| 2016/0068247 A1 | 3/2016 | Morvillo |

FOREIGN PATENT DOCUMENTS

| | | |
|---|---|---|
| JP | 2002-308582 | 10/2002 |
| JP | 2003-120395 | 4/2003 |
| JP | 2007-191138 | 8/2007 |
| JP | 2011-0183902 | 9/2011 |

OTHER PUBLICATIONS

Andrasko et al., "System and Method for Controlling Attitude of a Marine Vessel Having Trim Tabs", Unpublished U.S. Appl. No. 14/472,565, filed Aug. 29, 2014.

Andrasko et al., "Systems and Methods for Controlling Movement of Drive Units on a Marine Vessel", Unpublished U.S. Appl. No. 14/177,762, filed Feb. 11, 2014.

Mercury Marine, 90-8M0081623 JPO Owners Manual—Auto Trim Portion, Section 2—on the Water, May 2013, p. 21.

Mercury Marine, 90-8M0076286 JPO Service Manual—Auto Trim Portion, Theory of Operation, Jul. 2013, p. 2A-5.

Andrasko et al., "Systems and Methods for Automatically Controlling Attitude of a Marine Vessel with Trim Devices", Unpublished U.S. Appl. No. 14/873,803, filed Oct. 2, 2015.

Anscheutz, "System and Method for Trimming a Trimmable Marine Device with Respect to a Marine Vessel", Unpublished U.S. Appl. No. 15/003,326, filed Jan. 21, 2016.

(56) References Cited

OTHER PUBLICATIONS

Anscheutz, "System and Method for Trimming a Trimmable Marine Device with Respect to a Marine Vessel", Unpublished U.S. Appl. No. 15/003,335, filed Jan. 21, 2016.
US 5,730,865, 05/2009, Kado et al. (withdrawn)
Mercury Marine, SmartCraft Manual, p. 21, 2013.
Mercury Marine, SmartCraft Manual, p. 2A-5, 2013.
U.S. Appl. No. 13/770,591, filed Feb. 19, 2013.
U.S. Appl. No. 14/177,767, filed Feb. 11, 2014.
Newport, Motion Control Coordinate System, www.newport.com, pp. 7-2 through 7-25, website visited Nov. 18, 2014.
U.S. Appl. No. 14/284,795, filed May 22, 2014.
O'Brien et al., "Systems and Methods for Setting Engine Speed Relative to Operator Demand", Unpublished U.S. Appl. No. 14/684,952, filed Apr. 13, 2015.
Dengel et al., "Trim Control Systems and Methods for Marine Vessels", Unpublished U.S. Appl. No. 13/770,591, filed Feb. 19, 2013.
Japanese Office Action for Japanese Application 2017-136252 dated Nov. 14, 2017.
Japanese Office Action for Japanese Application 2017-136422 dated Nov. 14, 2017.
Japanese Office Action for Japanese Application 2017-136367 dated Nov. 28, 2017.

\* cited by examiner

SYSTEM AND METHOD FOR CONTROLLING TRIM POSITION OF PROPULSION DEVICES ON A MARINE VESSEL

FIELD

The present disclosure relates to systems and methods for controlling trim position of trimmable propulsion devices with respect to a transom of a marine vessel.

BACKGROUND

U.S. Pat. No. 6,322,404, incorporated by reference herein, discloses a Hall effect rotational position sensor is mounted on a pivotable member of a marine propulsion system and a rotatable portion of the rotational position sensor is attached to a drive structure of the marine propulsion system. Relative movement between the pivotable member, such as a gimbal ring, and the drive structure, such as the outboard drive portion of the marine propulsion system, cause relative movement between the rotatable and stationary portions of the rotational position sensor. As a result, signals can be provided which are representative of the angular position between the drive structure and the pivotable member.

U.S. Pat. No. 7,156,709, incorporated by reference herein, discloses the calibration procedure allows an upward maximum limit of tilt to be automatically determined and stored as an operator rotates a marine propulsion device relative to a marine vessel with a particular indication present. That indication can be a grounded circuit point which informs a microprocessor that at calibration procedure is occurring in relation to an upward trim limit. When the ground wire is removed or disconnected from the circuit point, the microprocessor knows that the calibration process is complete. During the rotation of the outboard motor or marine propulsion device in an upward direction, both the angular position of the outboard motor and the direction of change of a signal from a trim sensor are stored.

U.S. Pat. No. 7,416,456, incorporated by reference herein, discloses an automatic trim control system changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 8,011,982, incorporated by reference herein, discloses a support system for an outboard motor provides a restricted member that is attached to a bottom portion of the outboard motor and a restricting member that is attached to a support structure that is, in turn, attached to a transom of a marine vessel. The restricted member is prevented from moving in a starboard or port direction by a magnitude greater than a preselected magnitude that is defined by a gap between restricting and restricted surfaces that move into contact with each other when forces on the outboard motor cause a lower portion of the outboard motor to move by a magnitude greater than a predefined limit in either the port or starboard directions. Preselected gaps between restricting and restricted surfaces are sized to allow nominal vibration at low operating speeds of the outboard motor while restricting excessive lateral movement during operation at high speed.

U.S. Pat. No. 8,457,820, incorporated by reference herein, discloses a method is provided by controlling the operation of a marine vessel subject to porpoising. The method includes sensing an operational characteristic of the marine vessel which is indicative of porpoising of the marine vessel, and responding to the sensing of the operational characteristic with a response that is representative of the operational characteristic of the marine vessel as being indicative of the porpoising of the marine vessel.

Unpublished U.S. patent application Ser. No. 14/873,803, filed Oct. 2, 2015, and assigned to the Applicant of the present application, incorporated by reference herein, discloses systems and methods disclosed herein control position of a trimmable drive unit with respect to a marine vessel. A controller determines a target trim position as a function of vessel or engine speed. An actual trim position is measured and compared to the target trim position. The controller sends a control signal to a trim actuator to trim the drive unit toward the target trim position if the actual trim position is not equal to the target trim position and if at least one of the following is true: a defined dwell time has elapsed since a previous control signal was sent to the trim actuator to trim the drive unit; a given number of previous control signals has not been exceeded in an attempt to achieve the target trim position; and a difference between the target trim position and the actual trim position is outside of a given deadband.

Unpublished U.S. patent application Ser. No. 15/003,326, filed Jan. 21, 2016, and assigned to the Applicant of the present application, incorporated by reference herein, discloses a method for controlling a trim system on a marine vessel includes receiving an actual trim position of a trimmable marine device at a controller and determining a trim position error by comparing the actual trim position to a target trim position with the controller. The method also includes determining an acceleration rate of the marine vessel. In response to determining that the trim position error exceeds a first error threshold and the magnitude of the acceleration rate exceeds a given rate threshold, the controller commands the marine device to the target trim position. In response to determining that the trim position error exceeds the first error threshold and the acceleration rate does not exceed the given rate threshold, the controller commands the marine device to a setpoint trim position that is different from the target trim position. An associated system is also disclosed.

Unpublished U.S. patent application Ser. No. 15/003,335, filed Jan. 21, 2016, and assigned to the Applicant of the present application, which is incorporated by reference herein, discloses a method for controlling a trim system on a marine vessel includes receiving an actual trim position of a trimmable marine device at a controller and determining a magnitude of a trim position error by comparing the actual trim position to a target trim position with the controller. The method also includes determining a magnitude of an acceleration rate of the marine vessel. The controller determines the activation time of a trim actuator coupled to and rotating the marine device with respect to the marine vessel based on the magnitude of the trim position error and the magnitude of the acceleration rate. The controller then sends a control signal to activate the trim actuator to rotate the marine device toward the target trim position. The method includes discontinuing the control signal once the activation time expires to deactivate the trim actuator. A corresponding system is also disclosed.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of controlling trim position of two or more propulsion devices on a marine vessel includes receiving a running trim position for the two or more propulsion devices and receiving at least one of a steering input value or a roll angle of the marine vessel. An adjusted trim position for each of the at least two propulsion devices is then determined based on the running trim position and the steering input value or the roll angle of the marine vessel. A trim actuator for each propulsion device is then operated to move each propulsion device toward its respective adjusted trim position.

A system for controlling trim position of two or more propulsion devices on a marine vessel includes at least two trim actuators, each trim actuator configured to adjust a trim position of one of the at least two propulsion devices. The system further includes a controller configured to receive at least one of a steering input value or a roll angle of the marine vessel, and determine an adjusted trim position for each of the at least two propulsion devices based on a running trim position and the steering input value or the roll angle of the marine vessel. The controller further controls the trim actuator to move each of the at least two propulsion devices towards its respective adjusted trim position.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

The present disclosure relates to systems and methods for controlling trim actuators on a marine vessel so as to control a relative position of two or more propulsion devices mounted to the transom of a marine vessel. Those skilled in the art of marine vessel propulsion and control are familiar with many different ways in which the trim angle of a propulsion device such as an outboard motor or stern drive can be varied to change the handling or fuel efficiency of the vessel. For example, many manual trim control systems are known to those skilled in the art. In typical operation, the operator of a marine vessel can change the trim angle of an associated outboard motor as the velocity of the vessel changes. This is done to maintain an appropriate angle of the vessel with respect to the water as it achieves a planing speed and as it increases its velocity over the water while on plane. The operator inputs a command to change the trim angle for example by using a keypad, button, or similar input device with "trim up" and "trim down" input choices (e.g., see FIG. 4).

The systems of the present disclosure are also capable of carrying out automatic trim (auto-trim) methods, in which the propulsion device is automatically trimmed up or down with respect to its current position, depending on a desired attitude of the marine vessel with respect to vessel speed. Auto-trim systems perform trim operations automatically, as a function of vessel speed, without requiring intervention by the operator of the marine vessel. The automatic change in trim angle of the trimmable propulsion device 10 enhances the operation of the marine vessel as it achieves planing speed and as it further increases its velocity over the water while on plane. For example, trimming the propulsion device 10 can affect a direction of thrust of a propeller with respect to a vessel transom, as well as affect vessel roll and pitch.

Figure 1:
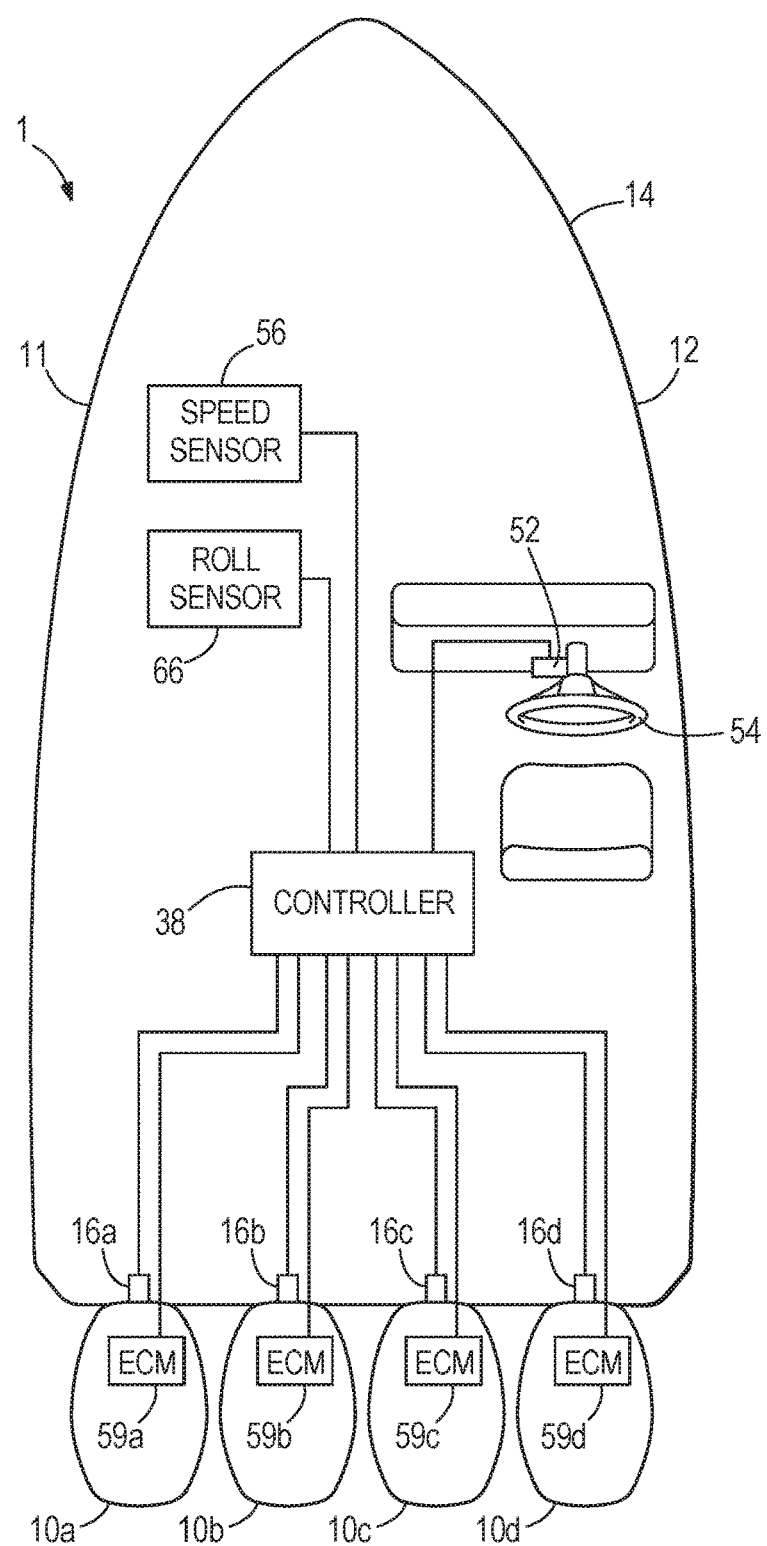
FIG. 1 is a schematic illustration of a marine vessel having a system for controlling trim position of propulsion devices.

FIG. 1 depicts one embodiment of a system 1 for controlling trim position of propulsion devices 10a-10d on marine vessel 14, which in the depicted embodiment include a port outer propulsion device 10a, a port inner propulsion device 10b, an inner starboard propulsion device 10c, and an outer starboard propulsion device 10d. While the methods and systems are described herein with respect to four propulsion devices 10a-10d, a person of ordinary skill in the art will understand in light of this disclosure that the disclosed methods and systems are equally applicable to marine vessels having more or fewer propulsion devices. Likewise, though the propulsion devices 10a-10d are exemplified in the FIGURES as outboard motors, a person having ordinary skill in the art will understand in light of this disclosure that the propulsion devices may also be stern drives with trimmable lower units. The trim position of each propulsion device 10a-10d is actuated by a respective trim actuator 16a-16d. In one example, the trim actuator is a hydraulic piston-cylinder assembly in fluid communication with a hydraulic pump-motor combination, although the principles of some of the below examples could apply equally to electric linear actuators, pneumatic actuators, or other types of trim devices. The trim actuator may be actuated between an extended position and a retracted position by provision of hydraulic fluid, electrical power, pneumatic fluid, etc. The extension and retraction of the trim actuator can be used to rotate a trimmable propulsion device up and down with respect to a marine vessel to which it is coupled.

On multi-engine offshore boats having more than two propulsion devices, the outer propulsion devices (e.g. 10*a* and 10*d*) tend to be rigged with shorter drive shaft lengths than the inner propulsion device(s). This is due to the hull design being deeper in the center than it is along the outside, requiring longer drive shaft lengths to get the cavitation plate near level with the bottom of the hull in the center and shorter drive shaft lengths on the outers. During cornering at high speeds, the marine vessel 14 rolls toward the port side 11 or starboard side 12 (depending on the direction of the turn). The outside propulsion device(s) on the high side of the turning marine vessel 14 tends to come out of the water, causing prop venting or blow out. Conversely, the propulsion device on the low side of the turning marine vessel 14 can end up buried too deep in the water, increasing drag. Such prop venting causes problems ranging from loss of speed to damage to the propulsion device. Through experimentation and research in the relevant field, the present inventor has recognized that the problems and issues relating to prop venting of the upper propulsion devices and drag by the lower propulsion devices in a steep turn can be lessened or prevented by changing the trim of the propulsion devices. For example, on a marine vessel having two or more propulsion devices, the trim position may be cascaded into and out of a corner so that the drive depth, or the depth of the propeller, remains approximately constant with respect to the surface of the water, regardless of the roll angle of the vessel. For example, the propulsion devices are cascaded by moving the upper propulsion device(s) to a more trimmed in (trimmed down) position and moving the lower propulsion device(s) into a more trimmed out (trimmed up) position. The inventor has further recognized that utilization of a feed-forward control system that predicts the aggressiveness of a cornering maneuver based on steering position and/or roll angle and prevents blow out, rather than just reacting to it, by making trim adjustments as the vessel turns and before the propeller breaks through the water surface.

The trimming operation of each trim actuator 16*a*-16*d* is controlled by controller 38, which is communicatively connected to each of the trim actuators 16*a*-16*d* to control activation thereof. The controller 38 controls trim of each of the propulsion devices 10*a*-10*d* separately by controlling the respective trim actuator 16*a*-16*d*, and such control may be provided as described herein based on one or more of engine speed, vessel speed, steering input value (such as steering wheel angle), and/or roll angle. In the depicted embodiment, the controller 38 receives engine speed, or engine RPM, from the engine control module (ECM) 59*a*-59*d* on each of the propulsion devices 10*a*-10*d*. The controller 38 also receives a vessel speed from speed sensor 56, and receives a roll angle of the marine vessel from the roll sensor 66. The controller 38 also receives a steering input from steering position sensor 52 on steering input device 54, which in the depicted embodiment is a rotational position sensor 52 detecting the rotational position of steering wheel 54. The rotational position of the steering wheel may be, for example, measured as an angle with respect to a centered position 55, which is the position of the steering wheel 54 associated with a straight ahead steering command. A person of ordinary skill in the art will understand in light of the disclosure that the steering input device 54 may be any number of user interface devices operable by a user to provide control inputs to steer the marine vessel, such as a joystick, trackpad, etc., and the steering position sensor 52 may be any sensor device that senses movement or input on said devices. Alternatively or additionally, the steering input may be provided by an automatic steering control system associated with the marine vessel 14, such as a heading or waypoint control system.

Figure 2:
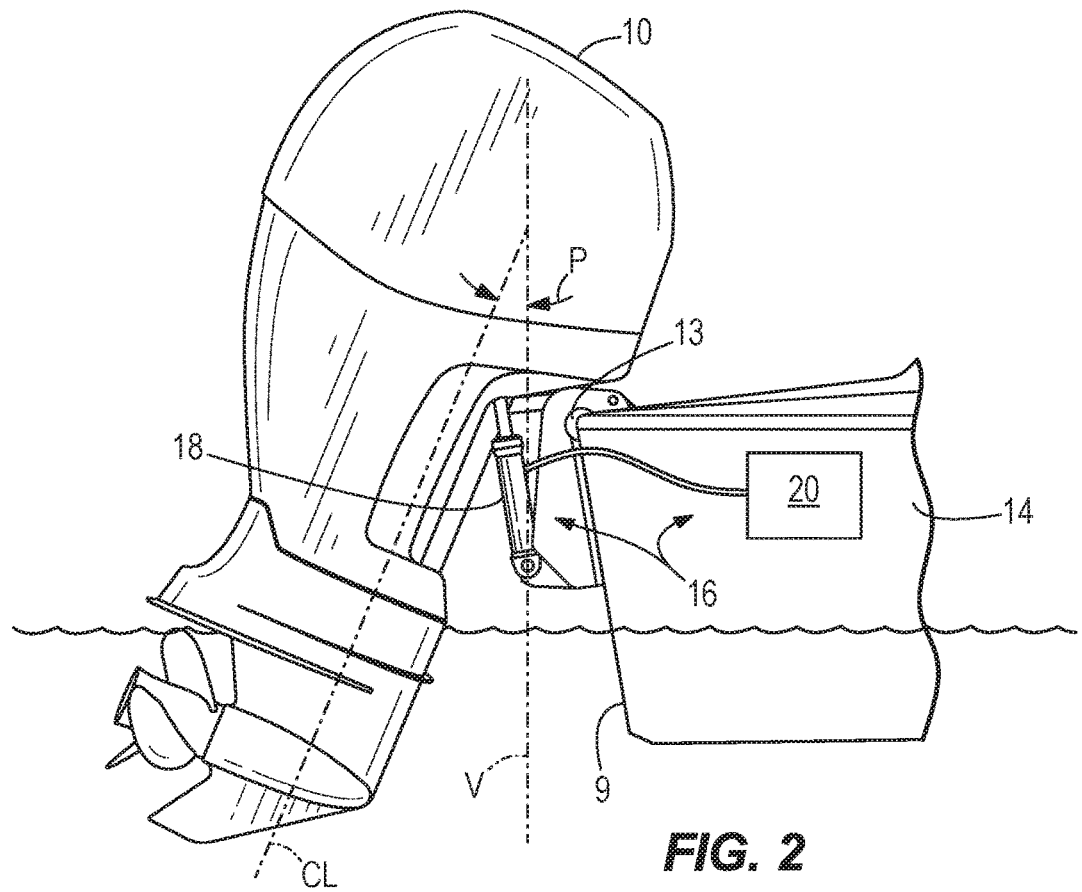
FIG. 2 depicts one embodiment of a trimmable propulsion device according to the present disclosure.

Referring to FIG. 2, the position of a trimmable propulsion device 10 (such as the outboard motor shown herein) with respect to the transom 9 of a marine vessel 14 is controlled by a hydraulic trim actuator 16. The trim actuator 16 includes a hydraulic piston-cylinder assembly 18 connected to a hydraulic pump-motor combination 20. The piston-cylinder assembly 18 has a first end (here, the cylinder end) coupled to the transom 9 of the vessel 14 and a second, opposite end (here, the rod end) coupled to the propulsion device 10, as known to those having ordinary skill in the art. The piston-cylinder assembly 18 operates to rotate the propulsion device 10 about a horizontal trim axis 13 to a trimmed-out position, to a trimmed-in position, or to maintain the propulsion device 10 in any position there between as the pump-motor combination 20 provides hydraulic fluid to the piston-cylinder assembly 18 to move the piston within the cylinder. As mentioned, however, other types of hydro-mechanical or electro-mechanical actuators could be used in other examples.

Figure 3:
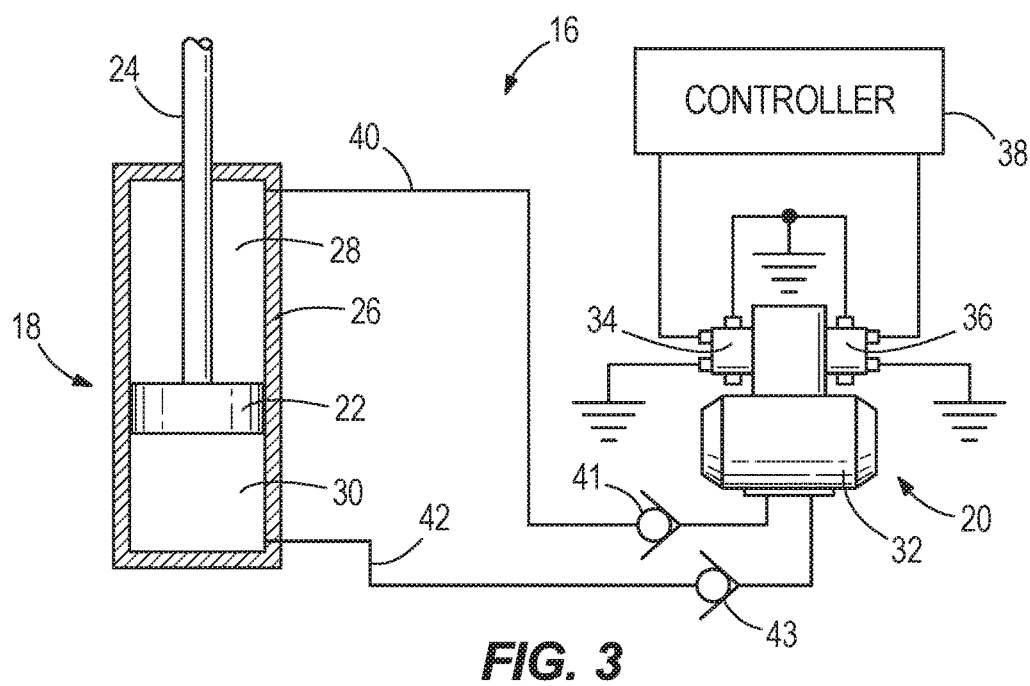
FIG. 3 is a schematic depiction of one embodiment of a trim actuator in a system for controlling trim position of propulsion devices.

One example of a hydraulic trim actuator 16 is shown in FIG. 3. The piston-cylinder assembly 18 is shown schematically as having a piston 22 connected to a rod 24 disposed in a cylinder 26. The piston 22 defines a first chamber 28 within the cylinder 26 and a second chamber 30 within the cylinder 26, both of which chambers 28, 30 change in size as the piston 22 moves within the cylinder 26. The pump-motor combination 20 includes a pump-motor 32 connected to a trim-in relay 34 and a trim-out relay 36. In other examples, the trim-in relay 34 and the trim-out relay 36 are a single relay that can turn the pump-motor 32 on or off and can effectuate a trim-in or trim-out movement of the trim actuator 16. The relays 34 and 36 are connected to a controller 38 that controls energizing of solenoids in the relays 34 and 36, which act as switches to couple a power source such as a battery (not shown) to chamber 28 of the piston-cylinder assembly 18, and a second hydraulic line 42 couples the pump-motor 32 to the second chamber 30 of the piston-cylinder assembly 18. As long as the trim-in relay 34 is activated, the pump-motor 32 provides hydraulic fluid through the first hydraulic line 40 to the first chamber 28 of the piston-cylinder assembly 18, thereby pushing the piston 22 downwardly within the cylinder 26 and lowering (trimming in, or trimming down) the propulsion device 10 coupled to the rod 24. As long as the trim-out relay 36 is activated, the pump-motor 32 provides hydraulic fluid through the second hydraulic line 42 to the second chamber 30 of the piston-cylinder assembly 18, thereby pushing the piston 22 upwardly within the cylinder 26 and raising (trimming out, or trimming up) the propulsion device 10 coupled to the rod 24. Hydraulic fluid can be removed from the opposite chamber 28 or 30 of the cylinder 26 into which fluid is not being pumped in either instance, and drained to a tank or circulated through the pump-motor 32.

In this way, the trim actuator 16 can position the propulsion device 10 at different angles with respect to the transom 9. These may be a neutral (level) trim position, in which the propulsion device 10 is in more or less of the vertical position V; a trimmed in (trimmed down) position; or a trimmed out (trimmed up) position. A trimmed out position, as shown in FIG. 2, is often used when the marine vessel 14 is on plane and high speeds are required. At high speeds, the trimmed out position causes the bow of the marine vessel 14 to rise out of the water, resulting in better handling and increased fuel efficiency. Thus, many auto-trim algorithms include determining a target running trim position at which to orient the propulsion device 10 with the controller 38 based on speed, such as but not limited to engine speed, vessel speed, a combination of vessel speed and engine speed, or a tradeoff between vessel speed and engine speed depending on additional vessel conditions. Examples of such systems are shown and described in U.S. Pat. No. 7,416,456; and U.S. application Ser. Nos. 14/873,803; 15/003,326; 15/003,335, which are incorporated herein by reference.

As an example, the controller 38 may define the running trim position by reference to vertical line V. When the centerline CL of the propulsion device 10 is parallel to the vertical line V, the controller 38 may consider this to be zero trim. Trim position can be quantified as a value P with respect to the vertical line V, which represents the angle or comparative position between the centerline CL of the propulsion device 10 and the vertical line V. This value P can be expressed as an angle, a percentage of a total angle to which the propulsion device 10 can be trimmed, a scalar value, a polar coordinate, or any other appropriate unit. For purposes of the description provided herein below, the angle P will be expressed as a percentage of total allowable trim angle, which can be measured from vertical, from a fully trimmed out position, or from a fully trimmed in position.

Figure 4:
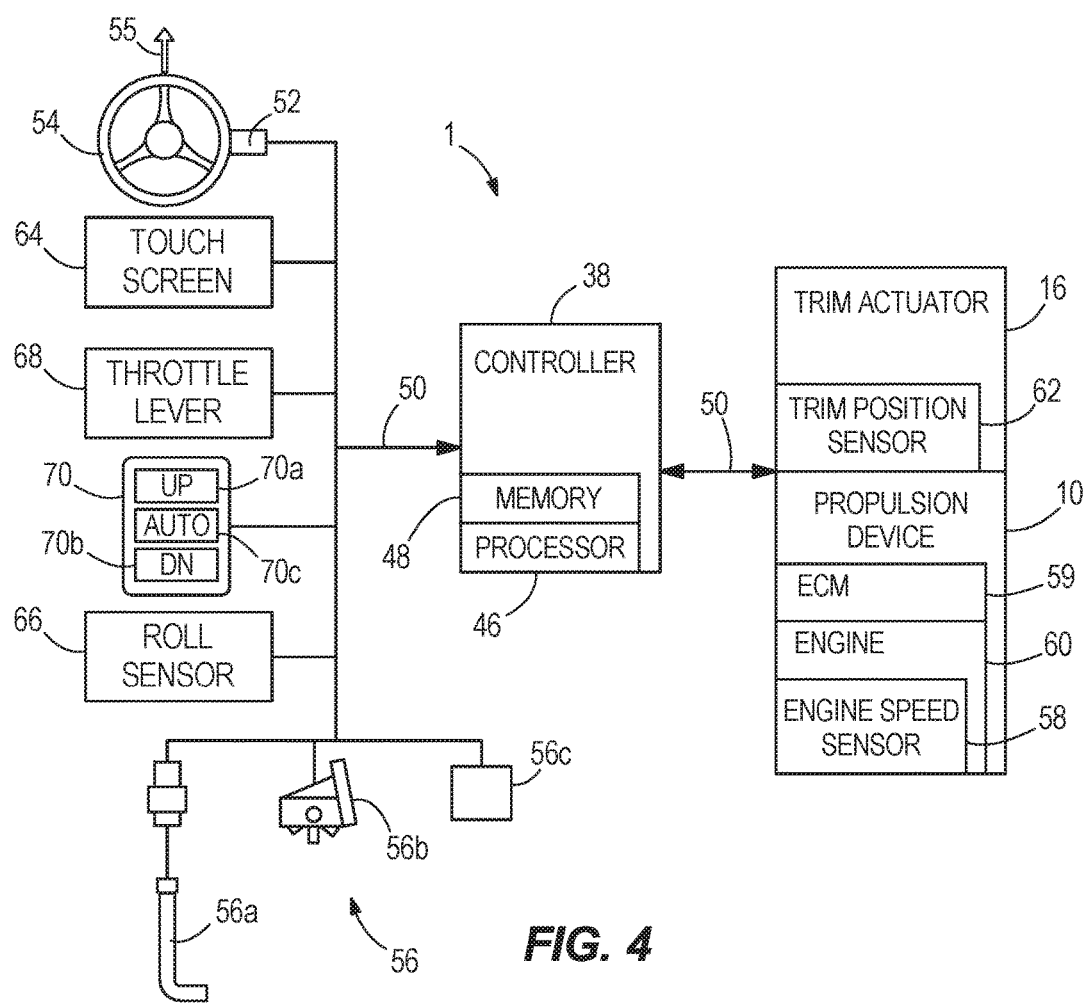
FIG. 4 is a schematic diagram depicting another embodiment of a system for controlling trim position of a propulsion device.

FIG. 4 shows a schematic of an embodiment of the system 1 for controlling trim position. In the example shown, the system 1 includes controller 38, which is programmable and includes a processor 46 and a memory 48. The controller 38 can be located anywhere on the marine vessel 14 and/or located remote from the marine vessel 14 and can communicate with various components of the system 1 via wired and/or wireless communication links, as will be explained further herein below. Although FIGS. 1 and 3 show a single controller 38, the system 1 may include more than one controller 38. For example, the system 1 may have a controller 38 located at or near a helm of the marine vessel 14 and can also have one or more controllers located at or near the propulsion devices 10*a*-10*d*. The controller 38 may be a dedicated device, or may be incorporated in and a function of a multi-function control device, such as incorporated into a helm control module (HCM) or other control device and software communicatively connected to the ECMs 59*a*-59*d*. Portions of the method disclosed herein below can be carried out by a single controller or by several separate controllers.

In some examples, the controller 38 may be a computing system that includes a processing system, storage system, software, and input/output (I/O) interfaces for communicating with devices such as those shown in FIG. 4, and described herein. The processing system loads and executes software from the storage system, such as software programmed with a trim control method. When executed by the computing system, trim control software directs the processing system to operate as described herein to execute the trim control method. The computing system may include one or many application modules and one or more processors, which may be communicatively connected. The processing system can comprise a microprocessor (e.g., processor 46) and other circuitry that retrieves and executes software from the storage system. Processing system can be implemented within a single processing device but can also be distributed across multiple processing devices or sub-systems that cooperate in executing program instructions. Non-limiting examples of the processing system include general purpose central processing units, application specific processors, and logic devices.

The storage system (e.g., memory 48) can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by a processing system. The storage media can be a non-transitory or a transitory storage media.

In this example, the controller 38 communicates with one or more components of the system 1 via a communication link 50, which can be a wired or wireless link. The controller 38 is capable of monitoring and controlling one or more operational characteristics of the system 1 and its various subsystems by sending and receiving control signals via the communication link 50. In one example, the communication link 50 is a controller area network (CAN) bus, but other types of links could be used. It should be noted that the extent of connections of the communication link 50 shown herein is for schematic purposes only, and the communication link 50 in fact provides communication between the controller 38 and each of the sensors, devices, etc. described herein, although not every connection is shown in the drawing for purposes of clarity.

As mentioned, the controller 38 receives inputs from several different sensors and/or input devices aboard or coupled to the marine vessel 14. For example, the controller 38 receives a steering input from a steering position sensor 52 that senses a position or angle of a steering input device, such as a joystick and/or a steering wheel 54. As described above, the steering input may also be provided by an automatic steering control system. The controller 38 may also be provided with an input from a vessel speed sensor 56. The vessel speed sensor 56 may be, for example, pressure-type sensor, such as pitot tube 56*a*, a paddle wheel type sensor 56*b*, or any other speed sensor appropriate for sensing the actual speed of the marine vessel. Alternatively or additionally, the vessel speed may instead be determined based on readings from a GPS device 56*c*, which calculates speed by determining how far the vessel 14 has traveled in a given amount of time. The propulsion device 10 may also be provided with an engine speed sensor 58, such as but not limited to a tachometer, that determines a speed of the engine 60 powering the propulsion device 10 in rotations per minute (RPM). The engine speed can be used along with other measured or known values to approximate a vessel speed (i.e., to calculate a pseudo vessel speed). A trim position sensor 62 may also be provided for sensing an actual position of the trim actuator 16, for example, by measuring a relative position between two parts associated with the trim actuator 16. The trim position sensor 62 may be any type of sensor known to those having ordinary skill in the art, for example a Hall effect sensor or a potentiometer, such as examples provided and described in U.S. Pat. No. 6,322,404 incorporated herein by reference. The controller 38 may also receive inputs from a roll sensor 66 that senses a roll position, such as an angle with respect to horizontal. For example, the roll sensor 66 may comprise a gyroscope, such as a three-axis gyroscope, to detect orientation information that may be used to determine the roll angle of the marine vessel 14. In other embodiments, the roll sensor 66 may be a magnetometer, or may include any other type of position or inertial measurement unit, such as a combination accelerometer and/or gyroscope with a magnetometer.

Other inputs to the system 1 can come from operator input devices such as a throttle lever 68, a keypad 70, and a touchscreen 64. The throttle lever 68 allows the operator of the marine vessel to choose to operate the vessel in neutral, forward, or reverse, as is known. The keypad 70 can be used to initiate or exit any number of control or operation modes (such as auto-trim mode), or to make selections while operating within one of the selected modes. In one example, the keypad 70 comprises an interface having a "trim up" button 70a, a "trim down" button 70b, and an "auto-trim on/resume" button 70c, which can be utilized by a user to control the running trim position of one or more of the propulsion devices 10a-10d. For example, the trim buttons 70a and 70b may provide user input to control all of the propulsion devices to the same running trim position. The touchscreen 64 can also be used to initiate or exit any number of control or operation modes (such as trim up, trim down, or auto-trim mode), and in that case the inputs can be buttons in the traditional sense or selectable screen icons. The touchscreen 64 can also display information about the system 1 to the operator of the vessel 14, such as engine speed, vessel speed, trim angle, trim operating mode, vessel acceleration rate, etc. Additionally, the touchscreen 64 may replace the keypad 70, providing the trim buttons 70a-70b.

As described above, the present inventor has recognized trim of the propulsion devices 10 on a marine vessel can be automatically controlled to discreetly control the two or more propulsion devices (e.g., 10a-10d) to different trim angles during cornering at high speeds in order to avoid prop venting by the upper propulsion devices 10 (on the outer side of the turn) and increased drag by the lower propulsion devices 10 (on the inside of the turn) when the marine vessel is in a rolled cornering position. Namely, one or more of the upper propulsion devices 10 can be trimmed in (or trimmed down) from the running trim position and/or one or more of the lower propulsion devices 10 can be trimmed out (trimmed up) from the running trim position in order to keep the propellers underneath the surface of the water.

Figure 5:
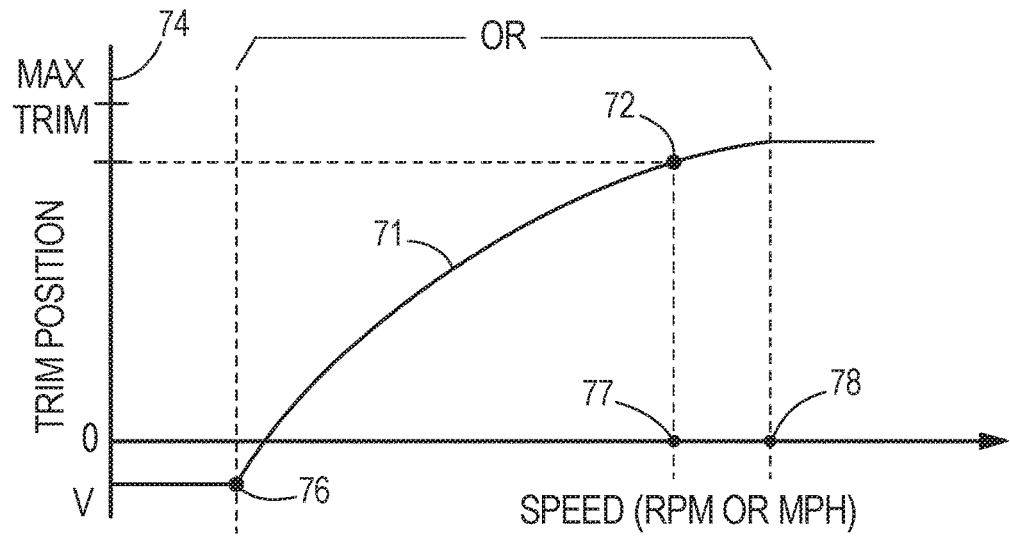
FIG. 5 exemplifies a relationship between speed and trim position.

FIG. 5 depicts a graphical representation showing the relationship between running trim position and speed, which may be engine RPM or vessel speed, which is applied when the marine vessel 14 is traveling in the straight ahead direction. The graph of FIG. 5 provides an example of how trim may be automatically controlled via an auto-trim system with respect to speed; however, a person having ordinary skill in the art will also understand in light of this disclosure that the methods and systems disclosed herein for controlling trim during cornering maneuver may also be applied in situations where the propulsion devices 10a-10d are controlled manually to a running trim position (such as via trim buttons 70a and 70b). As used herein, the running trim position refers generally to the current instructed or target trim position for the propulsion device 10 on a marine vessel based on the current running condition of the propulsion device and/or based on user input. Thus, the running trim position may be automatically controlled and instructed by an auto-trim system based on speed (vessel speed and/or engine RPM) or may be manually controlled by a user. The running trim position may further be a stored value, such as from the auto-trim system and/or a user control setting, or it may be a measured value, such as from the trim position sensor 62 associated with the trim actuator 16.

As described above, the trim position of the propulsion devices is generally increased as the vessel speed increases and the propulsion devices 10a-10d are generally trimmed out (applying positive trim) at high speeds when the marine vessel is on plane. The propulsion devices 10a-10d are movable to a maximum positive trim position 74 (or maximum trim out position). In the depicted example, the running trim position 72 is the value on the trim position curve 71 at the current speed 77. In the depicted relationship the running trim increases generally proportionally with the speed between the lower speed threshold 76 and the upper speed threshold 78. In the graph of FIG. 5, zero trim represents the vertical position when the propulsion device 10 is in line with vertical line V (FIG. 2). Negative trim positions, or trim in positions, are represented below the zero point on the trim position axis. In the depicted embodiment, the propulsion devices 10a-10d are maintained in a trimmed in position until the vessel reaches a lower speed threshold, which may be at or near the planing speed. Below the lower speed threshold 76, the trim position is maintained at a constant value. Likewise, above an upper speed threshold 78 the trim is also maintained at a constant value. This avoids making trim adjustments at speed below the planing speed and at very high speeds. Avoiding adjustment at very high speeds may be desirable in certain embodiments because adjusting trim at very high speeds may introduce unwanted instability for certain marine vessels 14. Accordingly, trim is only adjusted within an operating range OR between a lower speed threshold 76 and an upper speed threshold 78. In that range, the running trim position is determined based on the current speed 77 and the relationship is depicted by the trim position curve 71. The relationship between speed and trim position may be linear or curvilinear, and may vary, for example, based on vessel configuration.

Figure 6A:
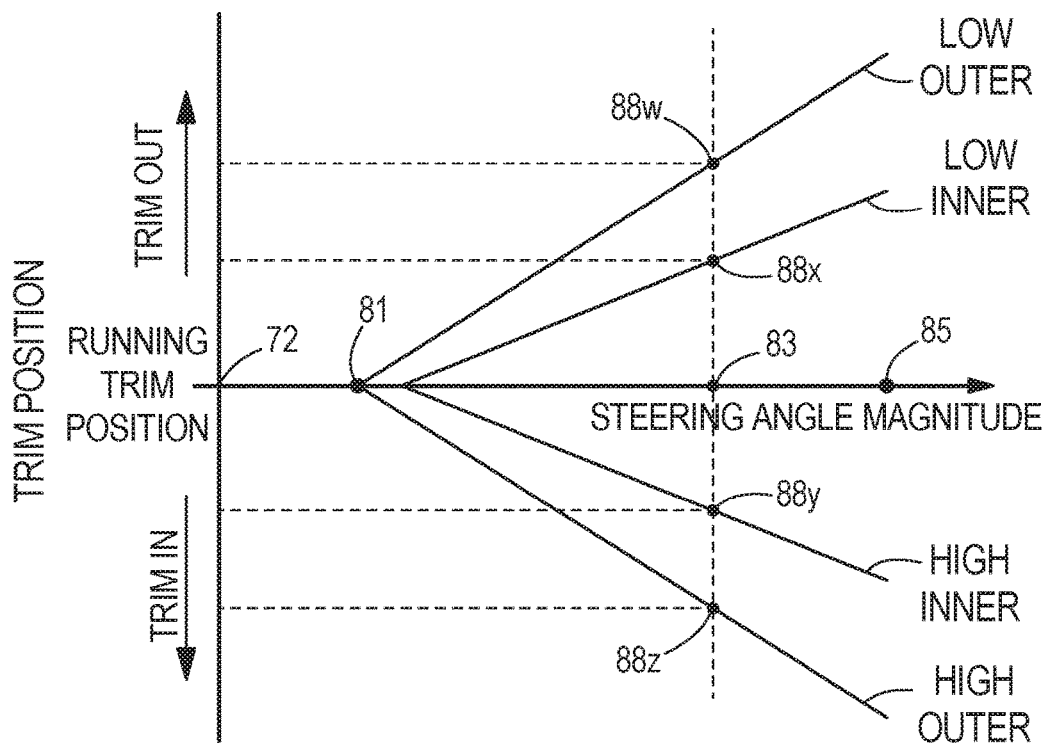
FIG. 6A exemplifies a relationship between steering input or roll angle and trim position.

FIG. 6A provides a graph exemplifying a possible relationship between steering input (exemplified as steering angle) and trim position at a given speed, such as a planing speed (speed where the vessel is on plane) or a speed above the lower speed threshold 76. In a given system 1, the relationship between steering position and trim position may vary at different speeds, and thus the graph may look different at different speeds. The y-axis represents trim, with the running trim position 72 providing a center point, or axis, around which the trim position of propulsion devices 10a-10d are adjusted with respect to the steering angle magnitude, represented on the x-axis. In the graph of FIG. 6A, the trim position of four propulsion devices 10a-10d are depicted, and the propulsion devices are identified as "low outer", "low inner", "high inner", and "high outer". In embodiments where the vessel is turning towards the starboard direction, for example, the outer starboard propulsion device 10d and the inner starboard propulsion device 10c will be the low outer and low inner propulsion devices, respectively and the outer port propulsion device 10a and inner port propulsion device 10b will be in the high inner and high outer positions, respectively. Conversely, if the turn is in the port direction, then the port side propulsion devices 10a and 10b will be in the low outer and low inner positions, while the starboard side propulsion devices 10c and 10d will be in the high inner and high outer positions.

In the depicted embodiment, the trim position remains at the running trim position value 72 until the magnitude of the steering input, which in this case is steering angle of steering wheel 54, reaches a threshold steering angle 81. Once the steering wheel 54 is moved past that threshold steering angle 81 the trim position of the propulsion devices is adjusted as depicted. For instance, the trim adjustment amount increases as the steering wheel 54 is turned away from the centered position 55 (i.e. as the magnitude of the steering angle increases) towards a maximum steering angle 85 (e.g., the steering end stop), and then decreases as the steering wheel 54 is turned back towards its centered position 55. The graph depicts an exemplary set of adjusted trim positions 88w-88z which will be assigned to each of the propulsion devices 10a-10d depending on the direction of steering—i.e., which propulsion devices are low and which propulsion devices are high. As the magnitude of the steering angle increases, the adjustment made to the trim position of each of the propulsion devices 10a-10d increases, with the outer propulsion devices 10a and 10d having a larger trim adjustment (either positively or negatively) than the inner propulsion devices 10b and 10c. Further, in the depicted embodiment, the adjustment to the trim position begins to occur at a lesser steering angle magnitude and changes more aggressively for the outer propulsion devices 10a and 10d than for the inner propulsion devices 10b and 10c. This relationship also holds true in an embodiment controlled based on roll angle, where the trim is likewise adjusted by an increasing amount as the roll angle of the marine vessel 14 increases.

The adjusted trim position 88w-88z are determined based on the current steering angle 83 for a given vessel speed. The adjusted trim positions 88w-88z may be adjusted during a turn to account for changes in speed, vessel speed or engine speed. If vessel speed does decrease during the course of a turn (e.g. because of a user reducing the throttle demand) the running trim position 72 will decrease, such as along the exemplary curve of FIG. 5, the adjusted trim positions 88w-88z can be predetermined accordingly. Vessel speed can be accounted for directly in the determination of adjusted trim position, or indirectly by basing it on running trim position. The running trim position 72 will decrease as the vessel speed or engine speed decreases (such as along the exemplary curve of FIG. 5) and the adjusted trim positions 88w-88z can be changed accordingly to account for the new running trim position 72.

Figure 6B:
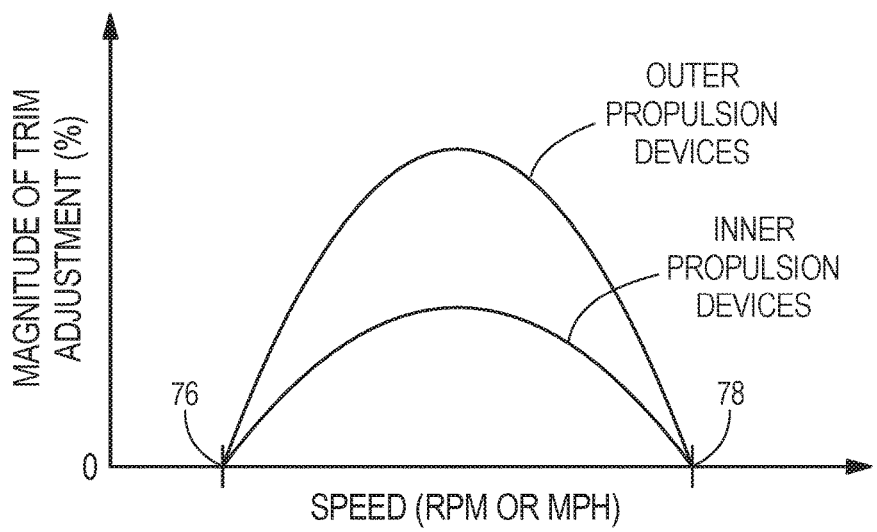
FIG. 6B exemplifies a relationship between magnitude of trim position and speed.

FIG. 6B provides another graph describing an exemplary relationship between the magnitude of trim adjustment (e.g., the difference between the running trim position 72 and the adjusted trim position 88w-88z) and speed for a particular steering input value or roll angle. The depicted trim adjustment is applied (either positively or negatively) to the running trim position. In the example, the magnitude of the trim adjustment is zero below the lower speed threshold 76, increases to a maximum, then decreases as it approaches the upper speed threshold 78, and is zero above the upper speed threshold 78. In the depicted embodiment, the inner propulsion devices and the outer propulsion devices are both adjusted above the lower speed threshold 76 and below the upper speed threshold 78; however, as described above, the trim adjustments are larger for the outer propulsion devices (e.g. 10a and 10d) than for the inner propulsion devices. However, in other embodiments the inner propulsion devices may be adjusted at different speed thresholds than the outers. The curves represent magnitude of the adjustment, which is applied oppositely on either side of the centerline of the vessel, as described above (i.e., propulsion devices on one side are trimmed out and the other side as trimmed in). The trim adjustments are only made in the operating range (OR) between the lower speed threshold 76 and the upper speed threshold 78. Accordingly, the depicted example avoids trim adjustments above the upper speed threshold 78. In other embodiments where such instability at the vessel's maximum speeds is not an issue, the curve may be shaped to provide the maximum trim adjustment magnitude at the high speed values. The depicted parabolic relationship between speed and trim adjustment magnitude is merely exemplary, and in other embodiments the relationship may be linear or curvilinear, and may vary, for example, based on vessel configuration. Likewise, the curve may look different for different running trim positions.

Figure 6C:
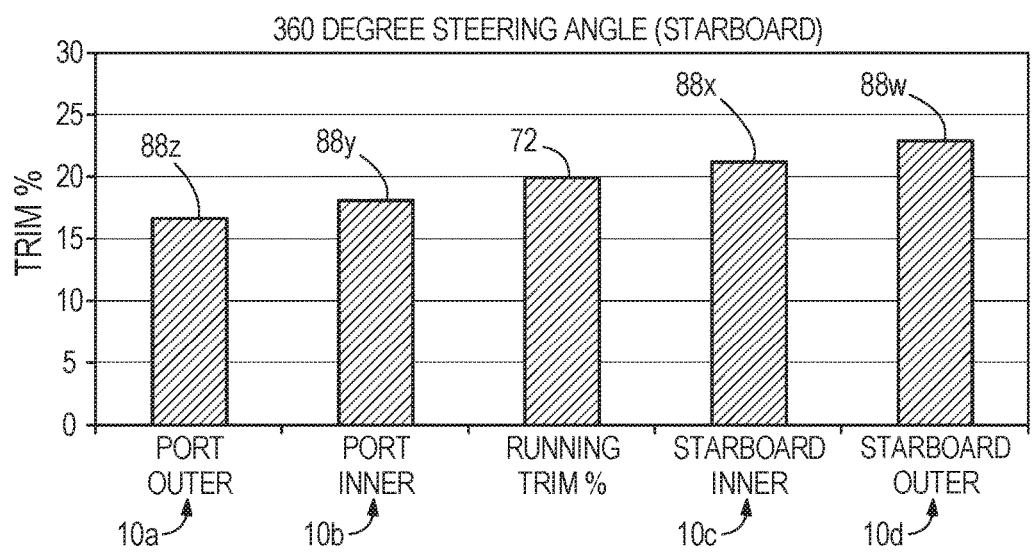
FIG. 6C provides one example of adjusted trim positions for four propulsion devices on a marine vessel based on a steering input.

FIG. 6C provides another illustrative depiction of this concept in the form of a bar graph representing the adjusted trim positions 88w-88z assigned to the four propulsion devices 10a-10d. In the illustrative example, the steering angle is 360 degrees in the starboard direction (i.e. steering wheel is turned 360 degrees from its straight-ahead position), and the running trim position 72 is at 20 percent. Since the turn is in the starboard direction, the port outer propulsion device 10a and port inner propulsion device 10b will be high and thus are trimmed in from the running trim position 72, with the port outer propulsion device 10a trimmed in the most to adjusted trim position 88z. Likewise, the starboard inner propulsion device 10c and starboard outer device 10d will be in the low positions and will be trimmed out from the running trim position 72, with the starboard outer propulsion device 10d trimmed out the most to adjusted trim position 88w. Conversely, if the steering angle were in the opposite direction (e.g. −360 degrees representing a turn in the port direction), the port side propulsion devices 10a and 10b would be trimmed out and the starboard side propulsion devices 10b and 10c would be trimmed in. While the depicted examples show symmetrical trim adjustments of the propulsion devices 10a-10d about the running trim position 72, in other embodiments the trim-in adjustments may have a different magnitude than the trim-out adjustments. Likewise, adjustments may not necessarily be made to all of the propulsion devices 10a-10d on the marine vessel.

In one embodiment, the adjustment amount between the running trim angle 72 and the adjusted trim position for each propulsion device on the marine vessel 14 is calibrated based on the vessel configuration, such as to account for the hull configuration of the marine vessel 14 and the number and positioning of the propulsion devises (e.g., 10a-10d) thereon. In reference to the quad example, the adjusted trim positions 88w-88z may be determined for each of at least two propulsion devices 10a-10d by accessing a lookup table based on one or more of the steering input value, the roll angle, the vessel speed, the engine RPM, and the running trim position, where the values in the lookup table are calibrated for the particular marine vessel 14 configuration.

Figure 7:
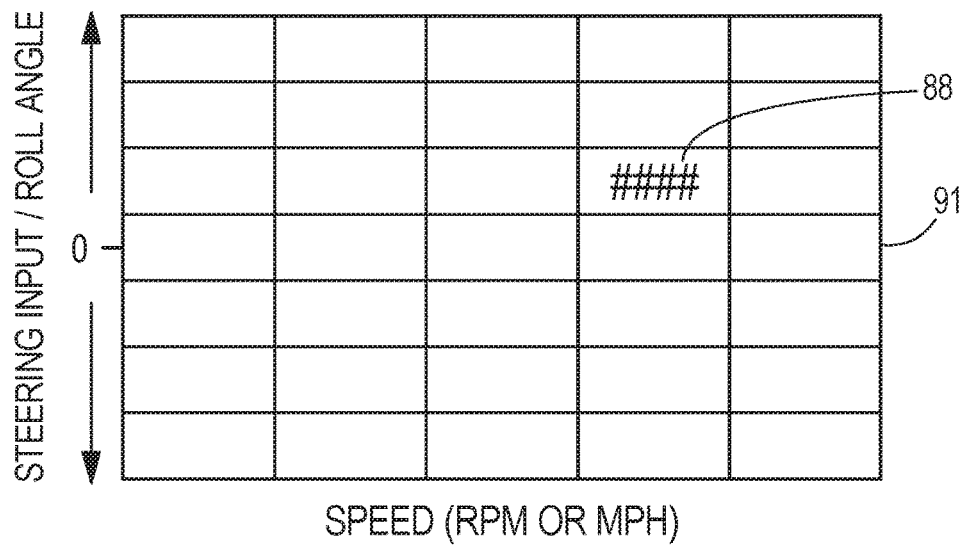
FIG. 7 exemplifies a lookup table that can be used to determine adjusted trim positions.

FIG. 7 depicts one exemplary lookup table 91 providing adjusted trim positions 88 for each of the propulsion devices 10a-10d (e.g., 88w-88z) based on the steering input value or roll angle and the speed, which could be the vessel speed or the engine speed. The values associated with the zero steering angle will be equal to the running trim position 72 at that speed. Adjusted trim positions 88 (e.g. one for each propulsion device 10 on the marine vessel 14) are provided in the lookup table 91 for steering input values or roll angle increments in each rotational direction. The trim actuators 16a-16d are then operated to move the associated propulsion device 10a-10d towards its respective adjusted trim position 88w-88z.

Figure 8:
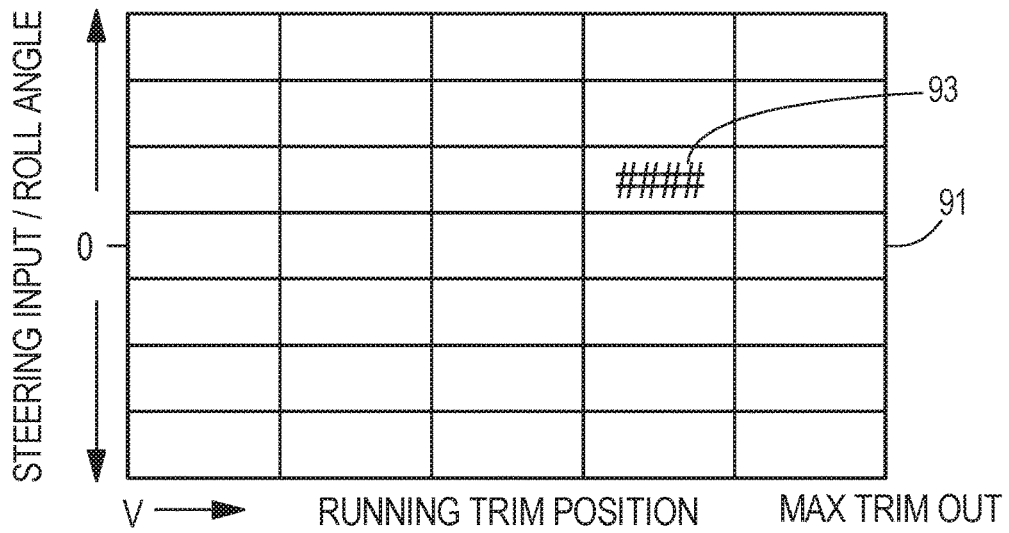
FIG. 8 exemplifies another lookup table that can be used to determine adjusted trim positions.

FIG. 8 depicts one exemplary embodiment, where a lookup table 91 contains trim adjustment values 93 based on running trim position and steering input or roll angle. The trim adjustment values 93 may be any values upon which the adjusted trim positions for each of the propulsion devices 10a-10d can be determined. For example, the trim adjustment values 93 may include a trim adjustment amount for each propulsion device 10a-10d, which could then be added or subtracted from the running trim position 72. Alternatively, the adjusted trim adjustment values 93 may be the actual adjusted trim positions 88w-88z, where no further calculation is necessary. In the depicted example, the lookup table 91 contains trim adjustment values 93 for steering input in both directions, as described above. In other embodiments, the lookup table 91 may be based on steering input magnitude or roll angle magnitude, and additional logic may be applied to determine whether the trim adjustment values 93 should be applied in the positive direction to trim out the propulsion device or the negative direction to trim in the propulsion device depending on whether it is in a low or high position.

In still another embodiment, determination of the adjusted trim positions 88w-88z may be performed using a lookup table of trim adjustment values 93 based on speed and steering wheel angle, and such values may then be added and/or subtracted to the running trim position, or used in conjunction with a some other process based on the running trim position 72.

Figure 9:
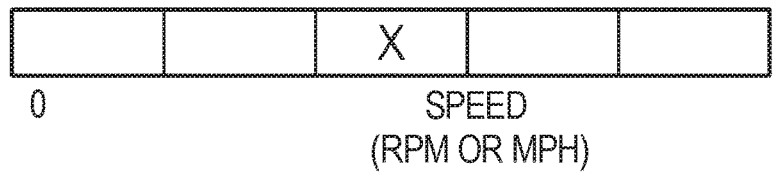
FIG. 9 exemplifies a lookup table that can be used to determine multipliers for determining adjusted trim positions.

In embodiments where the auto trim feature is in effect, and thus the running trim position 72 is determined based on speed (e.g., engine RPM or vessel speed), the running trim position value on the lookup table 91 will account for speed for purposes of determining the adjusted trim position. In embodiments where the running trim position 72 is set by a user, and thus may not correlate to speed with the desired accuracy, it may be desirable to apply a multiplier to the trim adjustment values 93 to ensure that trim adjustments are not applied outside of the operating range, or at least above the upper speed threshold 78. FIG. 9 depicts an exemplary one-dimensional lookup table 95 containing multiplier values X based on speed (e.g., engine RPM or vessel speed). Such a multiplier may account for the operating range OR of speeds discussed with respect to FIG. 5, and thus may operate to ensure that the trim position is not adjusted at speeds below a lower speed threshold 76 or above an upper speed threshold 78, and may also taper the speed adjustment (e.g., as exemplified in FIG. 6B). Similarly, such a multiplier table could be used in conjunction with one dimensional table providing a trim adjustment values based on steering input value or roll angle.

Figure 10:
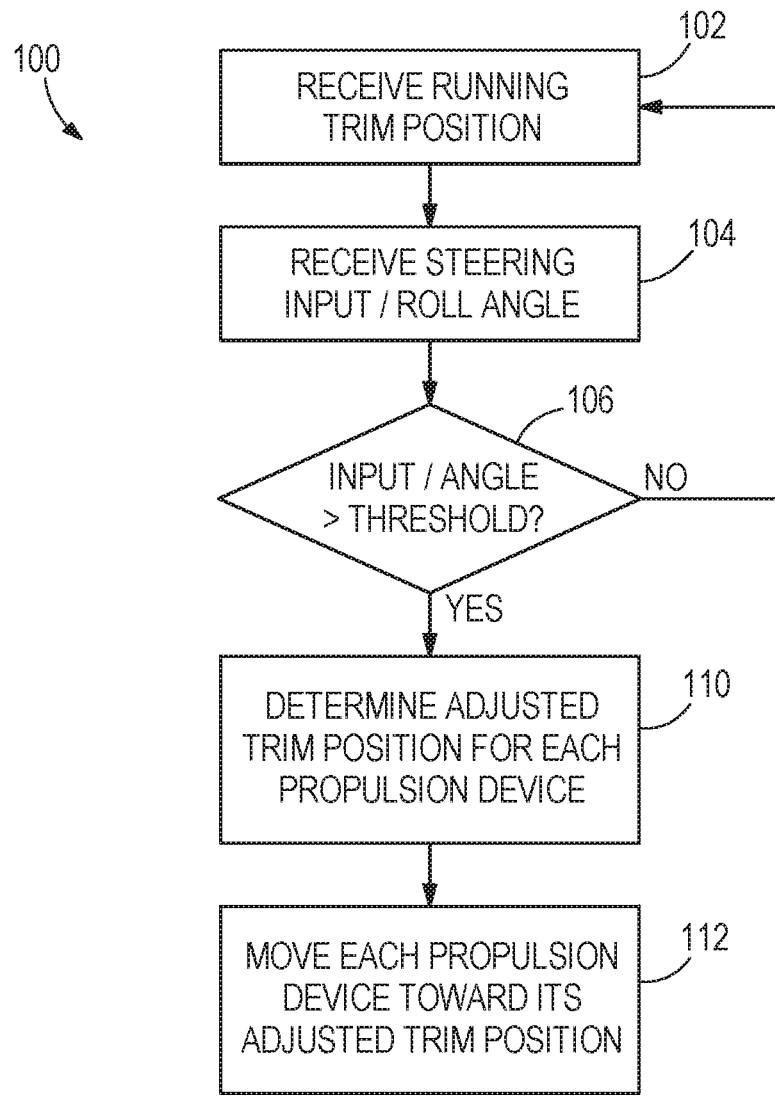
FIG. 10 depicts one embodiment of a method for controlling trim position of marine propulsion devices.

FIG. 10 is a flowchart depicting one embodiment of a method 100 of controlling trim position. The running trim position is received at step 102. As discussed above, the running trim position indicates the current trim position setting, which may be automatically controlled and set based on current conditions, such as speed, or may be a user set trim position. The running trim position may be the current value of a variable stored by an auto-trim control process, such as a value stored in memory 48 and retrievable by the processor 46. Alternatively, the running trim position may be received from the trim position sensor 62, reflecting the actual measured current trim position of the respective propulsion device 10a-10d. At step 104, the steering input and/or roll angle are received, such as from the steering position sensor 52 or the roll sensor 66. The steering input or roll angle received at step 104 are compared to a respective threshold value at step 106 to determine whether the steering input and/or roll angle are greater than the respective threshold value. If not, then the method returns to step 102, such that the steering input and/or roll angle are continually monitored to determine whether trim adjustment is required. If the steering input and/or roll angle do exceed the respective threshold values at step 106, an adjusted trim position is determined for each of the at least two propulsion devices 10a-10d based on the running trim position and the steering input value or the roll angle of the marine vessel at step 110. For example, the adjusted trim position may be determined via the lookup table exemplified in FIG. 8 and correspondingly described. Each propulsion device 10a-10d is moved toward its respective adjusted trim position at step 112, such as by sending control signals to the respective trim actuators 16a-16d to operate accordingly.

The method 100 of controlling trim position may be executed, for example, by the controller 38 executing software stored in memory 48 on processor 46. Alternatively or additionally, portions of the method may be executed by other control devices or modules, such as by a helm control module (HCM) for the marine vessel 14 and/or by the respective ECMs 59a-59d for the propulsion devices 10a-10d.

Figure 11:
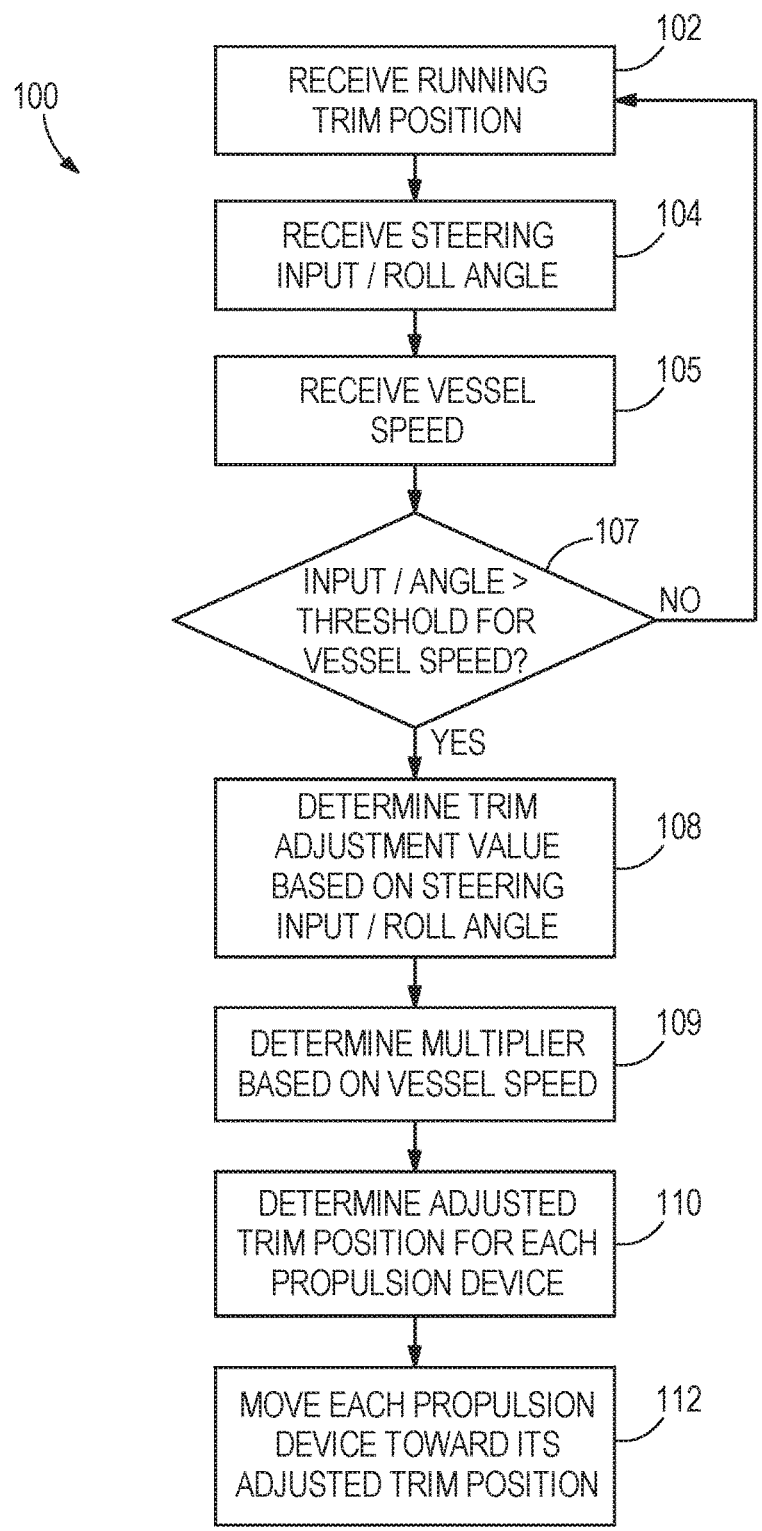
FIG. 11 depicts another embodiment of a method for controlling trim position of marine propulsion devices.

FIG. 11 depicts another exemplary embodiment of a method 100 for controlling trim position. The running trim position is received at step 102, and steering input and/or roll angle are received at step 104 as described above. At step 105, the current vessel speed is received. At step 107, the steering input and/or roll angle received at step 104 are compared to a threshold for that value type, where the threshold is identified based on the vessel speed received at step 105. Thus, the threshold for determining whether trim adjustment should be made is variable based on vessel speed. For example, the threshold for making trim adjustments may decrease as vessel speed increases, thereby increasing the trim reactiveness as vessel speed increases. In reference to embodiments disclosed and described herein, the vessel speed may be received, for example, from any one or more of the exemplary vessel speed sensors 56 described herein, including the pitot tube sensor 56a, paddle wheel sensor 56b, or GPS system 56c. Alternatively or additionally, steps 105 and 107 may be based on engine speed, such as from an engine speed sensor 58 on each of the propulsion devices 10a-10d. For example, the engine speed may be tracked by and received from each respective ECM 59a-59d. If the steering input and/or roll angle do not exceed the threshold then the method returns to step 102, continually monitoring the steering input and/or roll angle and comparing it to thresholds based on speed. In certain embodiments, the steering input and/or roll angle inputs may be filtered to prevent excessive trim cycling based on minor and momentary steering or roll changes.

Once the threshold is exceeded at step 107, the trim adjustment value is determined based on the steering input and/or roll angle at step 108. For example, the trim adjustment value may be determined utilizing a lookup table comparing trim position and steering input or roll angle, such as a one dimensional lookup table or a two dimensional lookup table based on running trim angle such as that exemplified and described above in FIG. 8. For instance, the lookup table may be a one dimensional lookup table providing trim angle adjustment amounts based one speed. In embodiments where the trim angle adjustment is pegged to running trim position but the running trim position is set by a user (rather than automatically determined based on speed) and thus may not be tied directly or exactly to the vessel speed or engine speed, the system 1 may execute step 109 to determine a multiplier based on the vessel speed (or engine speed), thus ensuring that the trim correction is not inappropriate for the current vessel speed. As described elsewhere herein, significant trim adjustments at high speeds may have potential for creating instability for the marine vessel 14, and thus significant trim adjustments may be avoided by including a multiplier that is less than one, or even equal to zero to reduce or eliminate trim adjustment at high speeds. As exemplified above with respect to FIG. 9, the multiplier may be determined by accessing a one-dimensional lookup table 95 correlating multiplier X values to speed increments, where trim adjustments at high speed values may have multiplier values X that approach or are equal to zero. For example, the multiplier X may be zero below the lower speed threshold 76 and/or above the upper speed threshold 78. Likewise, the multiplier X value may be significantly less than 1 and decrease as it approaches the lower speed threshold 76 and/or the upper speed threshold 78. The adjusted trim position for each propulsion device 10*a*-10*d* is determined at step 110, such as by multiplying the trim adjustment values determined at step 108 by the multiplier determined at step 109. Each propulsion device 10*a*-10*d* is then moved towards its adjusted trim position at step 112.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A method of controlling trim position of two or more propulsion devices on a marine vessel, the method comprising:
   receiving a running trim position for the two or more propulsion devices;
   receiving at least one of a steering input value or a roll angle of the marine vessel;
   determining an adjusted trim position for each of the at least two propulsion devices based on the running trim position and the steering input value or the roll angle of the marine vessel; and
   operating a trim actuator to move each propulsion device toward its respective adjusted trim position.

2. The method of claim 1, wherein the adjusted trim position for each one of the at least two propulsion devices is different.

3. The method of claim 1, wherein the steering input value is an angular position of a steering wheel with respect to a centered position.

4. The method of claim 1, wherein the adjusted trim position for a first one of the at least two propulsion devices is less than the running trim position, and the adjusted trim position for a second one of the at least two propulsion devices is greater than or equal to the running trim position.

5. The method of claim 4, wherein the marine vessel has an outer port propulsion device, an inner port propulsion device, an inner starboard propulsion device, and an outer starboard propulsion device, and further comprising:
   determining a first adjusted trim position for the outer port propulsion device, a second adjusted trim position for the inner port propulsion device, a third adjusted trim position for the inner starboard propulsion device, and a fourth adjusted trim position for the outer starboard propulsion device;
   wherein two of the first adjusted trim position, the second adjusted trim position, the third adjusted trim position, and the fourth adjusted trim position are less than the running trim position, and the remaining two of the first adjusted trim position, the second adjusted trim position, the third adjusted trim position, and the fourth adjusted trim position are greater than or equal to the running trim position.

6. The method of claim 1, further comprising determining that a magnitude of the steering input value is greater than a threshold steering input or a magnitude of the roll angle is greater than a threshold roll angle before determining the adjusted trim position.

7. The method of claim 1, wherein determining the adjusted trim position for each of the at least two propulsion devices includes accessing a lookup table of trim adjustment values based on either the steering input value or the roll angle.

8. The method of claim 7, wherein the running trim position is determined by a controller based on a vessel speed and/or an engine speed.

9. The method of claim 7, further comprising:
   receiving an engine speed or a vessel speed;
   determining a multiplier based on the vessel speed or the engine speed; and
   multiplying the trim adjustment values from the lookup table by the multiplier to determine the adjusted trim position.

10. The method of claim 9, wherein the multiplier is configured to minimize the difference between the running trim position and the adjusted trim position when the vessel speed or the engine speed is less than a lower speed threshold or greater than an upper speed threshold.

11. A system for controlling trim position of two or more propulsion devices on a marine vessel, the system comprising:
    at least two trim actuators, each trim actuator configured to adjust a trim position of one of the at least two propulsion devices;
    a controller configured to:
      receive a steering input value or a roll angle of the marine vessel;
      determine an adjusted trim position for each of the at least two propulsion devices based on a running trim position and the steering input value or the roll angle of the marine vessel; and
      control the trim actuator to move each of the at least two propulsion devices toward its respective adjusted trim position.

12. The system of claim 11, wherein the adjusted trim position for each one of the at least two propulsion devices is different from the other ones of the at least two propulsion devices.

13. The system of claim 11, wherein the controller receives the steering input value, wherein the steering input value is an angular position of a steering wheel with respect to a centered position measured by a steering position sensor.

14. The system of claim 13, wherein the marine vessel has an outer port propulsion device, an inner port propulsion device, an inner starboard propulsion device, and an outer starboard propulsion device, and wherein the trim controller is configured to:

determine a first adjusted trim position for the outer port propulsion device, a second adjusted trim position for the inner port propulsion device, a third adjusted trim position for the inner starboard propulsion device, and a fourth adjusted trim position for the outer starboard propulsion device;

wherein two of the first adjusted trim position, the second adjusted trim position, the third adjusted trim position, and the fourth adjusted trim position are less than the running trim position, and the remaining two of the first adjusted trim position, the second adjusted trim position, the third adjusted trim position, and the fourth adjusted trim position are greater than or equal to the running trim position.

15. The system of claim 14, further comprising determining that a magnitude of the steering input value is greater than a threshold steering input or a magnitude of the roll angle is greater than a threshold roll angle before determining the adjusted trim position.

16. The system of claim 11, wherein the adjusted trim position for a first one of the at least two propulsion devices is less than the running trim position and the adjusted trim position for a second one of the at least two propulsion devices is greater than or equal to the running trim position.

17. The system of claim 11, further comprising a lookup table accessible by the controller for determining the adjusted trim position for each of the at least two propulsion devices, wherein the lookup table lists trim adjustment values based on either the steering input value or the roll angle.

18. The system of claim 17, wherein the controller is configured to determine the running trim position based on a vessel speed and/or an engine speed.

19. The system of claim 17, wherein the controller is further configured to:
receive an engine speed or a vessel speed;
determine a multiplier based on the vessel speed or the engine speed; and
multiply the trim adjustment values from the lookup table by the multiplier to determine the adjusted trim position for each of the at least two propulsion devices.

20. The system of claim 19, wherein the multiplier is configured to minimize the difference between the running trim position and the adjusted trim position when the vessel speed or the engine speed is less than a lower speed threshold or greater than an upper speed threshold.

* * * * *